(12) United States Patent
Islam et al.

(10) Patent No.: US 7,889,124 B2
(45) Date of Patent: Feb. 15, 2011

(54) HANDHELD WIRELESS UTILITY ASSET MAPPING DEVICE

(76) Inventors: Mohammad Mojahedul Islam, 5467 Vineland Rd., #6210, Orlando, FL (US) 32811; Edward T. Sitler, 644 Coronado Crest La., Maryville, TN (US) 37804; Saul O. Iglesias, 10165 Hart Branch Cir., Orlando, FL (US) 32832; Joseph S. Purtell, 17 Brackenbury La., Beverly, MA (US) 01915; Sanjiv H. Devani, 81 Chandler Rd., Andover, MA (US) 01810

( * ) Notice: Subject to any disclaimer, the term of this patent is extended or adjusted under 35 U.S.C. 154(b) by 565 days.

(21) Appl. No.: 11/627,589

(22) Filed: Jan. 26, 2007

(65) Prior Publication Data

US 2008/0180319 A1    Jul. 31, 2008

(51) Int. Cl.
*G01S 19/00* (2010.01)
(52) U.S. Cl. .................................................. 342/357.2
(58) Field of Classification Search ............ 342/357.06, 342/357.07, 357.13, 357.17, 357.2, 357.25, 342/357.64; 701/213, 215
See application file for complete search history.

(56) References Cited

U.S. PATENT DOCUMENTS

| | | | |
|---|---|---|---|
| 5,734,348 A | | 3/1998 | Aoki et al. |
| 5,890,068 A | * | 3/1999 | Fattouche et al. ......... 455/456.2 |
| 6,339,745 B1 | | 1/2002 | Novik |
| 6,480,148 B1 | * | 11/2002 | Wilson et al. .......... 342/357.08 |
| 6,493,650 B1 | | 12/2002 | Rodger et al. |
| 6,662,103 B1 | | 12/2003 | Skolnick et al. |
| 6,806,813 B1 | | 10/2004 | Cheng et al. |
| 6,850,843 B2 | | 2/2005 | Smith et al. |
| 6,956,524 B2 | | 10/2005 | Tucker et al. |
| 2003/0058164 A1 | * | 3/2003 | Zhdanov et al. ......... 342/357.17 |
| 2004/0203887 A1 | * | 10/2004 | Galetti .................... 455/456.1 |
| 2004/0220731 A1 | | 11/2004 | Tucker et al. |
| 2005/0192752 A1 | * | 9/2005 | Rooney et al. ................. 702/5 |
| 2006/0055584 A1 | | 3/2006 | Waite et al. |
| 2006/0077095 A1 | | 4/2006 | Tucker et al. |
| 2006/0085133 A1 | | 4/2006 | Young et al. |

OTHER PUBLICATIONS

Web site http://www.cs.kent.ac.uk/projects/mobicomp/Fieldwork/ 2 pages printed Apr. 23, 2008.

* cited by examiner

*Primary Examiner*—Dao L Phan
(74) *Attorney, Agent, or Firm*—Patent Authority LLC; Elliot Furman

(57) ABSTRACT

A wireless utility asset mapping device comprises a pole, a positioning receiver connected to the pole, a wireless modem connected to the positioning receiver and the pole, and at least one waterproof housing enclosing the positioning receiver and the wireless modem. The wireless modem is a long range wireless modem and has a range of at least 500 feet in low density and high density areas. The wireless utility asset mapping device may also comprise an external interface module, and external equipment in communication with the external interface module. A utility asset is located and the wireless utility asset mapping device is placed over the location of the utility asset. The coordinate of the wireless utility asset mapping device is determined and wirelessly transmitted over long distance in low density and high density areas.

26 Claims, 6 Drawing Sheets

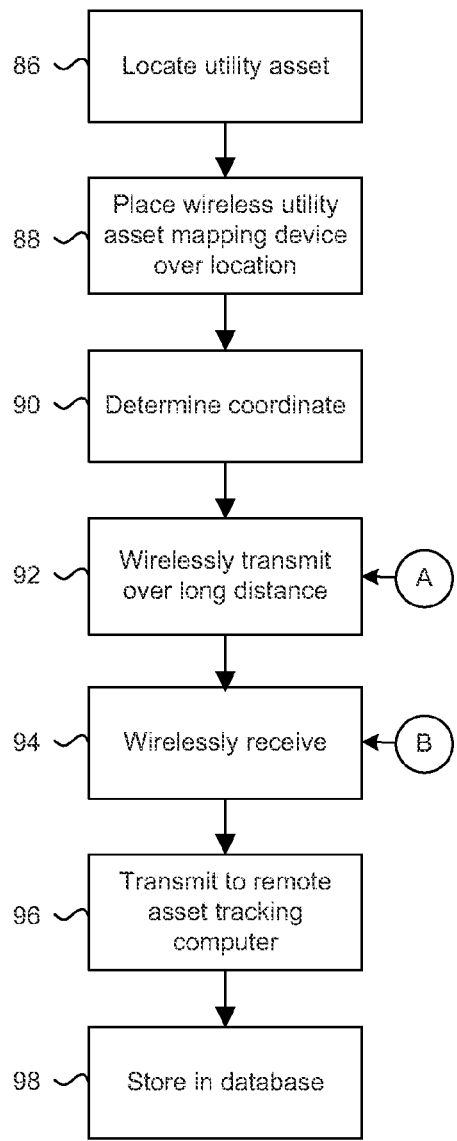
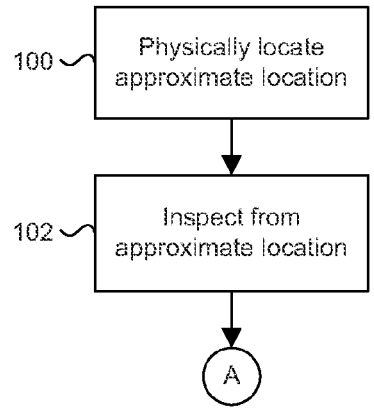
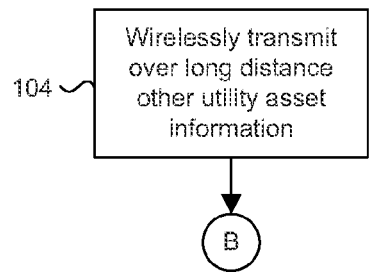
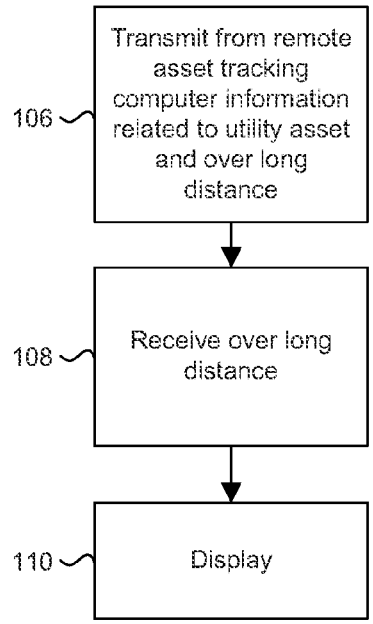

HANDHELD WIRELESS UTILITY ASSET MAPPING DEVICE

BACKGROUND

Utility assets include sewer, storm, fiber, and gas pipelines for utilities such as, natural gas, electric, water, sewer, stormwater, telecommunications, gasoline and oil. In order to maintain utility assets, and to do construction in and around utility assets, it is absolutely essential to have accurate maps of the utility assets. Inaccurate maps can lead to serious damage to utility assets, and to disruption of vital utilities. Even worse, inaccurate maps can lead to injury and even death of utility workers and civilians, as occurred in 2004 in California when a backhoe excavating for a water distribution line punctured a buried high-pressure fuel pipeline. Gasoline released into the water pipe trench was ignited by welding activities inside the pipe, creating an explosion that killed five workers.

Companies have long attempted to maintain accurate records of utility assets using various surveying techniques. In recent years, global positioning systems (GPS) have been used to more accurately ascertain the position of utility assets. Some of these prior art systems are bulky and must be transported to a site in a truck or trailer. To cut down on bulk, some prior art systems employ a hand-held GPS unit with internal memory. A utility worker surveying for utility assets stores the GPS coordinates of found utility assets in the internal memory. Later, the stored GPS coordinates are manually transferred to a database in an asset tracking computer. By manual transferring, it is meant that either the GPS coordinates are read from the GPS unit and typed into the asset tracking computer, or the GPS unit or memory of the GPS unit is connected to the asset tracking computer and electronically transferred.

While potentially providing more accurate location information, the process of finding the utility asset, storing it in the GPS unit, and manually transferring it to the database is still cumbersome, and error prone. Furthermore, the coordinates by themselves are not as useful without a utility asset type assigned to those coordinates. Thus, additional steps often required in the prior art include the utility worker keeping a record of the type of utility asset at the coordinates, and manually transferring the type with the coordinates, after storing. Some attempts to eliminate some steps of the manual transfer process have been made by employing a GPS unit with built-in Bluetooth transceiver (IEEE 802.15). However, since Bluetooth has a range of only tens of feet, the pairing of GPS with Bluetooth for the purpose of transmitting coordinates to an asset tracking computer has proved to be less than practical in real world application.

Thus there is a need for a wireless utility asset mapping device and method. Also, there is a need for a system and method to wirelessly transmit GPS coordinates of utility assets over a long distance to a remote asset tracking computer. Additionally, there is a need for a system and method to wirelessly transmit GPS coordinates and other data related to utility assets to a remote asset tracking computer.

SUMMARY

A wireless utility asset mapping device comprise a pole having a top end, a bottom end, and a middle section extending from the top end to the bottom end. A positioning receiver is connected to the pole. The positioning receiver is connected closer to the top end of the pole than the bottom end. A wireless modem is connected to the positioning receiver. The wireless modem is a long distance wireless modem and has a range of at least 500 feet in low density and high density areas. At least one weatherproof housing encloses the positioning receiver and the wireless modem. A wireless utility asset mapping device method comprises locating a utility asset, placing a wireless utility asset mapping device over the location of the utility asset, determining a coordinate of the wireless utility asset mapping device, and wireless transmitting the coordinate over long distance in both low density and high density areas.

The foregoing paragraph has been provided by way of general introduction, and it should not be used to narrow the scope of the following claims.

BRIEF DESCRIPTION OF THE DRAWINGS

FIG. 8 shows a method for wirelessly tracking utility assets.
FIG. 9 shows additional steps of determining a coordinate for the method of FIG. 8.
FIG. 10 shows steps of wirelessly transmitting other utility asset information for the method of FIG. 8.
FIG. 11 shows steps of receiving and displaying related information proximal to the wireless utility asset mapping device for the method of FIG. 8.

DETAILED DESCRIPTION

Figure 1:
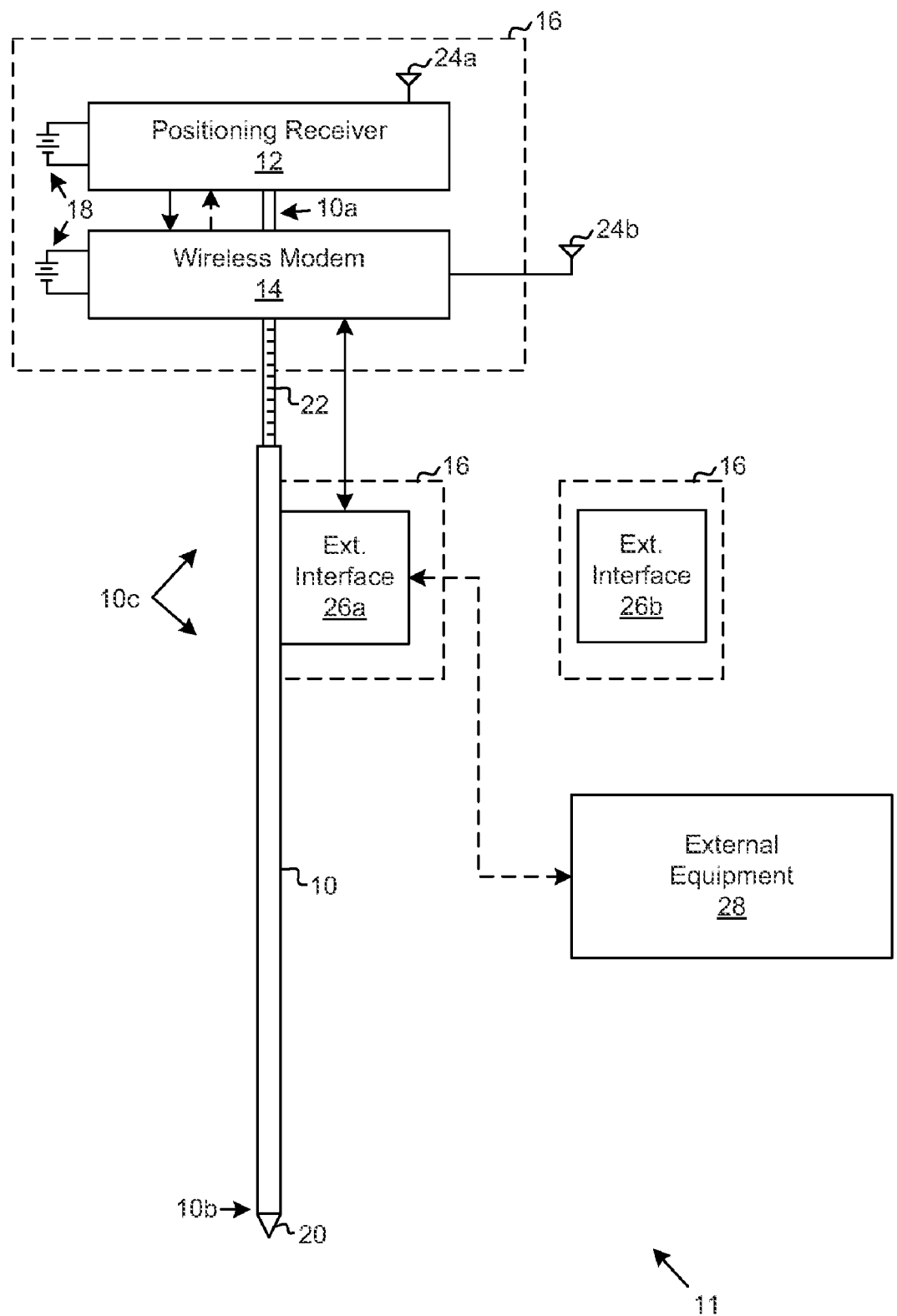
FIG. 1 is a wireless utility asset mapping device.

Referring to FIG. 1 a wireless utility asset mapping device 111 (equivalently referred to herein as the "device") is shown. The wireless utility asset mapping device 11 includes a pole 10, a positioning receiver 12 connected to the pole 10, a wireless modem 14 connected to the pole and the positioning receiver 12, and at least one weatherproof housing 16 enclosing the positioning receiver 12 and wireless modem 14.

The pole 10 has a top end 10a, a bottom end 10b, and a middle section 10c connecting the top end 10a and the bottom end 10b, and extending the distance between the top end 10a and bottom end 10b. Positioning receiver 12 and wireless modem 14 are both connected closer to the top end 10a of pole 10 than the bottom end 10b.

The device 11 also includes at least one battery 18 connected to positioning receiver 12 and wireless modem 14. The at least one battery 18 powers positioning receiver 12, wireless modem 14, and any other components (to be described below) of the device. While FIG. 1 shows one exemplary device having two batteries, it is understood that one battery may be employed, or more than two batteries may be employed. The battery or batteries may be integral to positioning receiver 12, wireless modem 14, at least one weatherproof housing 16, or other components. Furthermore, the device 11 may comprise a solar powered source comprising a solar cell(s). For example a solar power source may provide power and be connected to positioning receiver 12 and wireless modem 14, and/or the solar power source may be connected to battery 18 for charging the battery 18.

In one embodiment, positioning receiver 12 comprises a global positioning system (GPS) receiver having sub-meter accuracy. Such global positioning receivers are well understood by those having ordinary skill in the art, and are widely commercially available. One exemplary GPS receiver is the GPS Pathfinder ProXT receiver sold by Trimble Navigation. Other exemplary GPS receivers include receivers from Leica and Garmin, receivers that are NMEA-0183 compatible, and receivers which are operable through an RS-232 port.

Positioning receiver 12 is connected to wireless modem 14. Wireless modem 14 is a long range wireless modem. Wireless modem 14 receives digital and/or analog data from positioning receiver 12 and transmits it wirelessly over long distance. By "long distance" and "long range" it is meant that the data is transmitted such that it can be reliably received by a compatible wireless receiver at least 500 feet away. Furthermore "long distance" and "long range" means that the long range wireless modem operates reliably in many different environments. One type of an environment is a "low density" area, for example rural areas and areas where there are few line of sight obstructions. Another environment is a "high density" areas. High density areas include areas such as cities, areas with a high density of people, buildings and structures, and in or near areas such as cities and airports where there is usually significant ambient radio frequency noise.

Wireless modem 14 may be a radio frequency (RF) modem comprising an RF transmitter operating in a frequency band around at least 900 MHz. For example, the wireless modem 14 may operate in frequency bands of 900 MHz, 2.4 GHz, 3.5 GHz, 5.8 GHz, other frequency bands above 5.8 GHz, other frequency bands below 5.8 GHz, or any other available, widely used, or allowable frequency band used for wireless communications.

Furthermore wireless modem 14 may operate according to many well understood standards and principles. For example, wireless modem 14 may comprises a spread spectrum modem. Also, wireless modem 14 may operate according to a specification such as an 802.xx wireless specification. As used herein, 802.xx is meant to refer to any number of wireless specifications from the Institute of Electrical and Electronic Engineers (IEEE). Without limitation, one example of an 802.xx wireless specifications includes 802.16, also known as WiMAX. Those skilled in the art will appreciate that are many other 802.xx wireless specifications either in existence, proposed, or to be proposed that may be employed by the wireless modem to operate over long distance. The wireless modem 14 may operate according to any number of wireless packetized data specifications or protocols. The wireless modem 14, and other elements of the wireless utility asset mapping device may comprise a unique network identifier such as a MAC address and IP address.

Of course wireless modem 14 does not have to operate according an 802.xx specification, and may operate according to many well known wireless methods capable of long distance communications. One example of a spread spectrum wireless modem 14 capable of both transmitting and receiving digital data is the XStream PKG RF Modem sold by MaxStream. Another type of RF modem comprises a modem which communicates via an existing cellular or mobile phone network.

The pole 10 may comprise many different types of materials, shapes, colors, and may have various different features. For example in one embodiment, the pole is fixed in length. In another embodiment, the pole is variable in length and may be telescoping. The variable length pole may be variable from around three feet to around seven feet. The length of the pole may be varied by opening or loosening a handle, lock, collar, or other prior art device of the pole to allow it to extend or retract, and then closing the handle, lock, or collar to lock to the desired length. The variable length pole may alternately have threaded telescoping portions that extend and retract by turning the telescoping portions in the threads. The variable length pole may have threaded or non-threaded attachments, collars, or rings that allow shorter sections of pole, extensions, or devices to be added to or removed from the pole, thereby increasing or decreasing its length. Also, the variable length pole may comprise markings 22 indicating the length of the pole.

Furthermore, the bottom end 10b of the pole 10, whether variable in length or fixed, may comprise a point 20, or a stand such as a tripod or a base, or other device that allows the pole to stand without being held. The bottom end 10b may also comprise a helical device such as an auger, a drill, a large "corkscrew", or similar attachment. The helical device may be manually rotated (for example, into the ground) or may be powered. The helical device may be telescopic or otherwise extendible. The bottom end 10b of the pole 10 may further comprise a sensor. The sensor may comprise a transmitter, a receiver, a transceiver, a transponder, and the like. For example, the bottom end 10b of the pole 10 may comprise a sonde receiver.

As mentioned briefly above, the device 11 also includes at least one weatherproof housing 16. There may be one or more than one weatherproof housing 16 enclosing positioning receiver 12 and wireless modem 14. For example, positioning receiver 12 may be enclosed by a first weatherproof housing and wireless modem 14 may be enclosed by a second weatherproof housing 14. The battery or batteries may be enclosed by their own weatherproof housing, or they may share a weatherproof housing with positioning receiver 12 and/or wireless modem 14. Weatherproof housings also include waterproof housings. The weatherproof housing may be brightly colored. It may be made of plastic or any suitable material and may include gaskets and other well known weatherproofing devices.

The device 11 may also comprise at least one antenna. It is well understood that positioning receiver 12 and wireless modem 14 each comprise at least one antenna. These at least one antennas may be enclosed within positioning receiver 12 and/or wireless modem 14 and/or at least one weatherproof housing 16. For example antenna 24a is connected to positioning receiver 12 and enclosed by at least one weatherproof housing. Further, positioning receiver 12 may have one or more antennas (not shown) internal to a case housing positioning receiver 12.

Likewise, wireless modem may have one or more antenna. As shown in FIG. 1, at least one antenna 24b extends from weatherproof housing 16. Antenna 24b is connected to wireless modem 14. The at least one antenna may also be connected to positioning receiver 12 or wireless modem 14 with a wire which passes through the at least one weatherproof house 16, and the antenna mounted on the pole 10.

Examining FIG. 1, the device 11 may also include an external interface module 26. If included, the external interface module is in communication with wireless modem 14 and/or with positioning receiver 12. This may done in many ways, for example, as shown in FIG. 1, the positioning receiver 12 and the external interface module are both connected directly to the wireless modem 14. However, in another configuration (illustrated in FIG. 7), the positioning receiver 12 is connected to the external interface module 26a, which in turn is connected to the wireless modem 14. Of course other configurations are possible, by themselves, or in combination.

Additionally, if the external interface module 26 is included, for example external interface module 26a, it may be connected to pole 10 around the middle section 10c of the pole 10, for example, just above the midway point between top end 10a and bottom end 10b. In another embodiment, external interface module 26b is not connected to pole 10. In this case, external interface module 26b may be in wireless communication with position receiver 12 and/or wireless modem 14 through at least one antenna 24a, 24b or another antenna described above but not illustrated. In yet another embodiment, the device comprises more than one external interface module, such as modules 26a and 26b. Here, modules 26a and 26b may be in communication with each other, and thus module 26b is in communication with wireless modem 14 and/or positioning receiver 12 through module 26a. No matter the case, if an external interface module 26 is included, at least one more weatherproof housing 16 may be included to enclose the external interface module(s) 26.

The external interface module 26 may comprise any number of items such as switches, buttons, circuits, a handheld computer, a wireless mobile device, a touch screen, a keyboard or keypad, antennas, a camera, a speaker, a microphone, lights, light emitting diodes, liquid crystal displays, an antenna, circuits for storing data, manipulating data, routing data, and ports such as memory card ports, serial ports, parallel ports, optical ports, Ethernet ports, pcmcia ports, and the like.

Referring briefly above with reference to positioning receiver 12 and wireless modem 14, one or both may also comprise at least one communication port. Examples of communication ports include serial ports, parallel ports, optical ports, Ethernet ports, pcmcia ports, and the like. It is understood, for example, such ports include low speed as well as high speed ports such as USB and Firewire ports. These and other ports may be used to connect, for example, positioning receiver 12 to wireless modem 14, and external interface module 26a to wireless modem 14. Additionally, positioning receiver 12 and/or wireless modem may comprise a wireless transceiver such as an 802.xx wireless transceiver. For example, positioning receiver 12 may comprise a wireless personal area network transceiver, such as a Bluetooth transceiver (IEEE 802.15), connected to antenna 24a. In this case, for example, external interface module 26b may comprise a handheld computer or mobile wireless device comprising a Bluetooth transceiver, and module 26b may communicate over short distance with positioning receiver 12 which in turn is in communication with wireless modem 14.

The wireless utility asset mapping device 11 may also comprise external equipment 26. The external equipment 28 is in communication with external interface 26. The external equipment may comprise any number of devices for collecting data, detecting conditions, surveying conditions, and taking any number of measurements in and around utility assets, including underground and underwater. As well understood by those having ordinary skill in the art, such external equipment may employ electromagnetic, magnetic, sonic, acoustic, radar such as ground penetrating radar, live line detection, and robotic crawler systems and methods. Thus a small example of the range of external equipment includes a line locator, a metal detector, a still camera, a video camera, a radar such as a ground penetrating radar and subsurface interface radar, an acoustic sensor, a magnetic detector, an electromagnetic detector, a gas detector, a sonar device, a sonde transmitter, a sonde receiver, a submersible camera, a robotic crawler, a pipe scrubbing and scraping device, a smart pig, a horizontal drilling device, a vertical drilling device, a thermal imaging device, a microgravity detector, a radiation detector, an x-ray device, a pressure measuring device, and a seismic detector.

Figure 2:
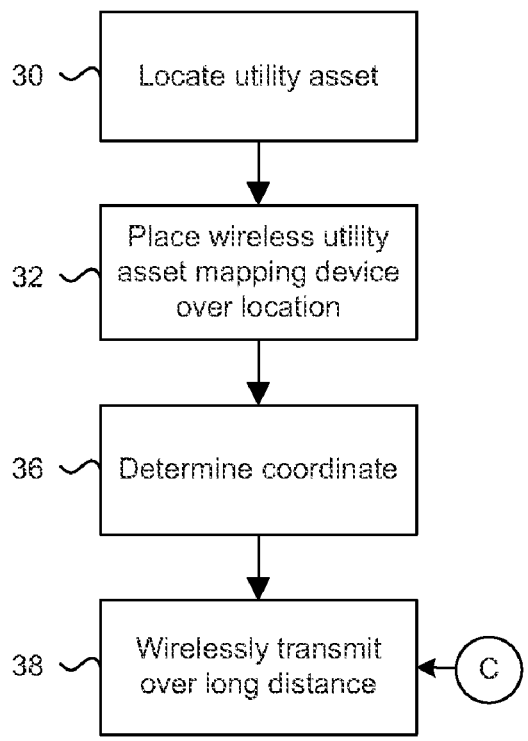
FIG. 2 is a wireless utility asset mapping device method.

With this in mind, FIG. 2 shows a wireless utility asset mapping device method. Briefly, a utility asset is located (step 30), the wireless utility asset mapping device is placed over the location of the utility asset (step 32), the coordinate of the wireless utility asset mapping device is determined (step 36), and the coordinate is transmitted over long distance (step 38).

Adding additional detail, the utility asset is located (step 30) by visual inspection and/or through records. The step of locating (30) may yield the exact location or the asset or a branch of the asset, such as a manhole cover, or only the approximate location in the case where the asset is obscured or buried. In either case, a worker places the bottom end of the pole of the wireless utility asset tracking device over the exact or approximate location of the utility asset (step 32).

Referring briefly back to FIG. 1, when the wireless utility asset tracking device is operating, positioning receiver 12 determines the coordinates of the positioning receiver 12, and in turn the pole 10, which in turn indicates the location of the utility asset. These coordinates, which comprise a latitude and longitude, are received by the wireless modem 14 which transmits them over long distance. As will be disclosed below, the coordinates (along with optional other information) may be received and stored in a remote asset tracking computer.

Accordingly, and with reference to FIG. 2, the coordinate is determined with sub-meter accuracy (better than one meter) (step 36), and the coordinate is transmitted over long distance (step 38). As already disclosed the step of transmitting (step 38) may comprise at least one of the following: transmitting around at least a 900 megahertz band, transmitting with spread spectrum modulation, transmitting according to an 802.xx wireless specification, and transmitting packetized wireless data.

Figure 3:
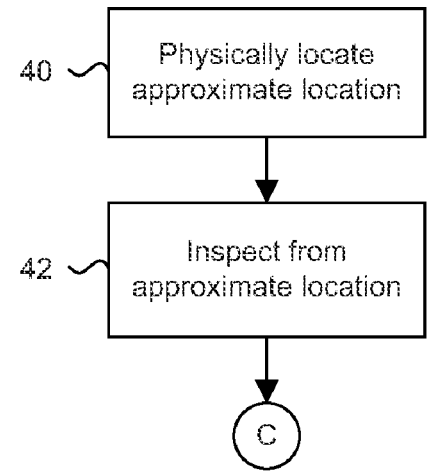
FIG. 3 shows additional steps of locating a utility asset.

As sometimes happens, the utility asset is buried or otherwise obscured. In this case, the step of locating (step 26) further comprises physically locating an approximate location of the utility asset (step 40 of FIG. 3), and inspecting the utility asset from the approximate location to determine a more precise location (step 42 of FIG. 3).

As disclosed above with reference to the external equipment (28 of FIG. 1), the inspecting (step 42) further comprises any number of the following, or equivalent: inspecting visually, inspecting with a line locator, inspecting with a metal detector, inspecting with a still camera, inspecting with a video camera, inspecting with radar, inspecting with sound, inspecting with magnetic fields, inspecting with electromagnetic fields, inspecting with a gas detector, inspecting with sonar, inspecting with a sonde transmitter, inspecting with a sonde receiver, inspecting with a submersible camera, inspecting with a robotic crawler, inspecting with a pipe scrubbing and scraping device, inspecting with a smart pig, inspecting with a horizontal drilling device, inspecting with a vertical drilling device, inspecting with thermal imaging, inspecting with a microgravity detector, inspecting with a radiation detector, inspecting with x-rays device, inspecting with a pressure sensor, and inspecting with a seismic detector.

Since the external equipment (28 of FIG. 1) is in communication with the wireless modem (14 of FIG. 1) through the external interface (26 of FIG. 1), during and after inspection (step 42 of FIG. 3) at least one of the following may also be transmitted over long distance (step 38): a depth measurement, sensor measurements, a still image, a video, text, and audio. The sensor measurements may include any measurements available from the external equipment, such as radiation levels, sonar ping statistics, electromagnetic field levels and variances, and the like. Still images and video many also be transmitted, for example from cameras as mentioned with respect to the external equipment (28 of FIG. 1).

The text and audio may comprise any text and audio entered or spoken into the external interface. As mentioned, the external interface module (26 of FIG. 1) may include any number of items including switches, buttons, a handheld computer, a touch screen, a keyboard, a keypad, and so on as disclosed above. In this way, text and audio entered into the external interface may be transmitted over long distance.

Figure 4:
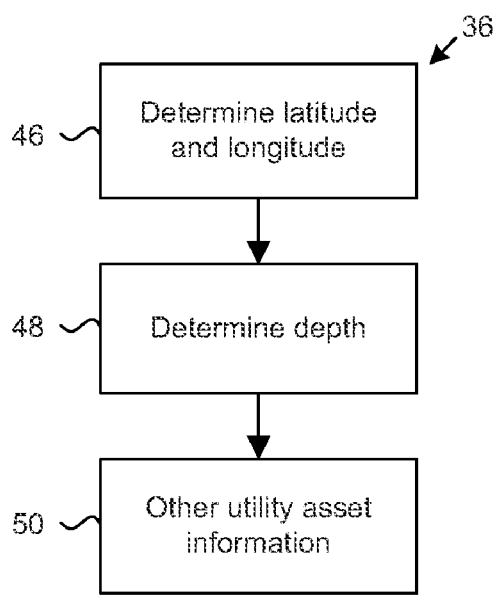
FIG. 4 shows additional steps of determining a coordinate.

Referencing FIG. 4 which shows the steps, some optional, of determining a coordinate (step 36 of FIG. 2), as can be appreciated by now in light of the above disclosure, determining a coordinate includes determining a latitude an longitude (step 46), and optionally determining a depth (step 48). Thus when transmitting the coordinate over long distance (step 38) it is understood that that the "coordinate" can include other data, such as a depth and other information of interest to an inspector or utility worker.

For the purposes of understanding the scope of the step of transmitting over long distance (step 38), the transmitting may also include other utility asset information (step 50). Some of the this other utility asset information was already disclosed above with reference to the external equipment, and includes, but is in no way limited to depth measurements, sensor measurements, still images, video, text, and audio. It may also include control signals such as a capture signal, and signals indicated utility asset types.

Briefly, coordinates and optionally other utility asset information is transmitted, and that transmission may, as suggested and as will be described later, be received and stored by a remote computer a long distance away. In one embodiment, the transmissions are continuously stored as they are received. In another embodiment, the transmissions are stored only when signaled by a worker operating the wireless utility asset mapping device.

In this embodiment, and by way of example, when a worker believes he has successfully identified and inspected the utility asset, he signals this by way of the external interface (26 of FIG. 1). For example, in a simple but useful illustration, a button of the external interface is pressed when the utility asset is located, causing a capture signal (step 50) to be generated by the external interface and transmitted, along with the coordinates (step 48) and any other information (step 48, 50), over long distance (step 38).

A remote receiving computer is configured such that received information is stored only in response to the capture signal. Those skilled in the art will appreciate that many variations are possible, and many different types of data and control signals may be generated. For example, the capture signal may be of abbreviated length such that only one coordinate sample or other utility asset information is captured, or of extended length to capture a series of transmissions. There may be more than one button of the external interface and each one, when pressed may indicate an asset type, for example, gas, water, and the like. Additional buttons may indicate additional details. In the case where the external interface includes a portable computer, or keypad, or touch screen, or the like, the same and still more detailed information and control signals can be transmitted over long distance.

Figure 5:
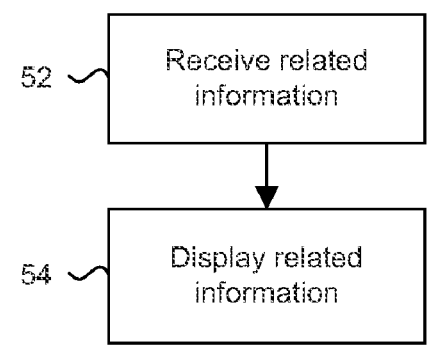
FIG. 5 shows steps of receiving and displaying related information proximal to the wireless utility asset mapping device.

Referring to FIG. 5, in the case where, as mentioned, the wireless modem (14 of FIG. 1) includes both a wireless transmitter and a wireless receiver, the wireless utility asset mapping device may receive transmissions, such as information related to the inspection of the utility asset (step 52), and display the related information of the external interface (step 54).

Figure 6:
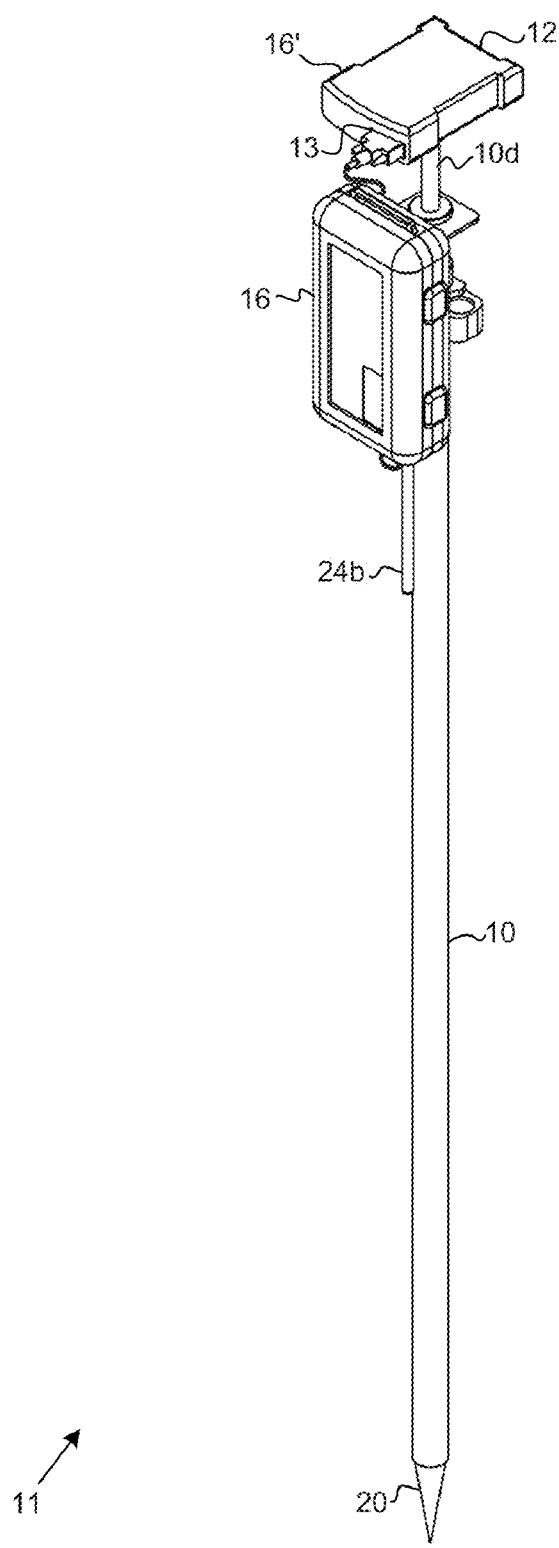
FIG. 6 shows one exemplary embodiment of the wireless utility asset mapping device.

Now, looking at FIG. 6, one exemplary model of the wireless utility asset mapping device is shown. The device 11 includes a pole 10 with a pointed bottom end 20, and is extendable by way of a telescoping portion 10*d*. The device 11 further includes positioning receiver 12 connected to a wireless modem enclosed in weatherproof housing 16. In this exemplary model, the positioning receiver 12 is manufactured such that its case 16' is weatherproof, and thus an additional weatherproof housing is not necessary. An antenna 24*b* connected to the wireless modem extends from the weatherproof housing. A battery internal to positioning receiver 12 provides power to the positioning receiver 12, and a battery enclosed in weatherproof housing 16 is connected to the wireless modem, also enclosed in the weatherproof housing 16. Further, positioning receiver 12 includes a communication port through which position receiver 12 is in communication with the wireless modem, which has a corresponding communication port. The exemplary model of FIG. 6 shows only one configuration, and those skilled in the art will appreciate that many other configuration are possible in light of above disclosure.

Figure 7:
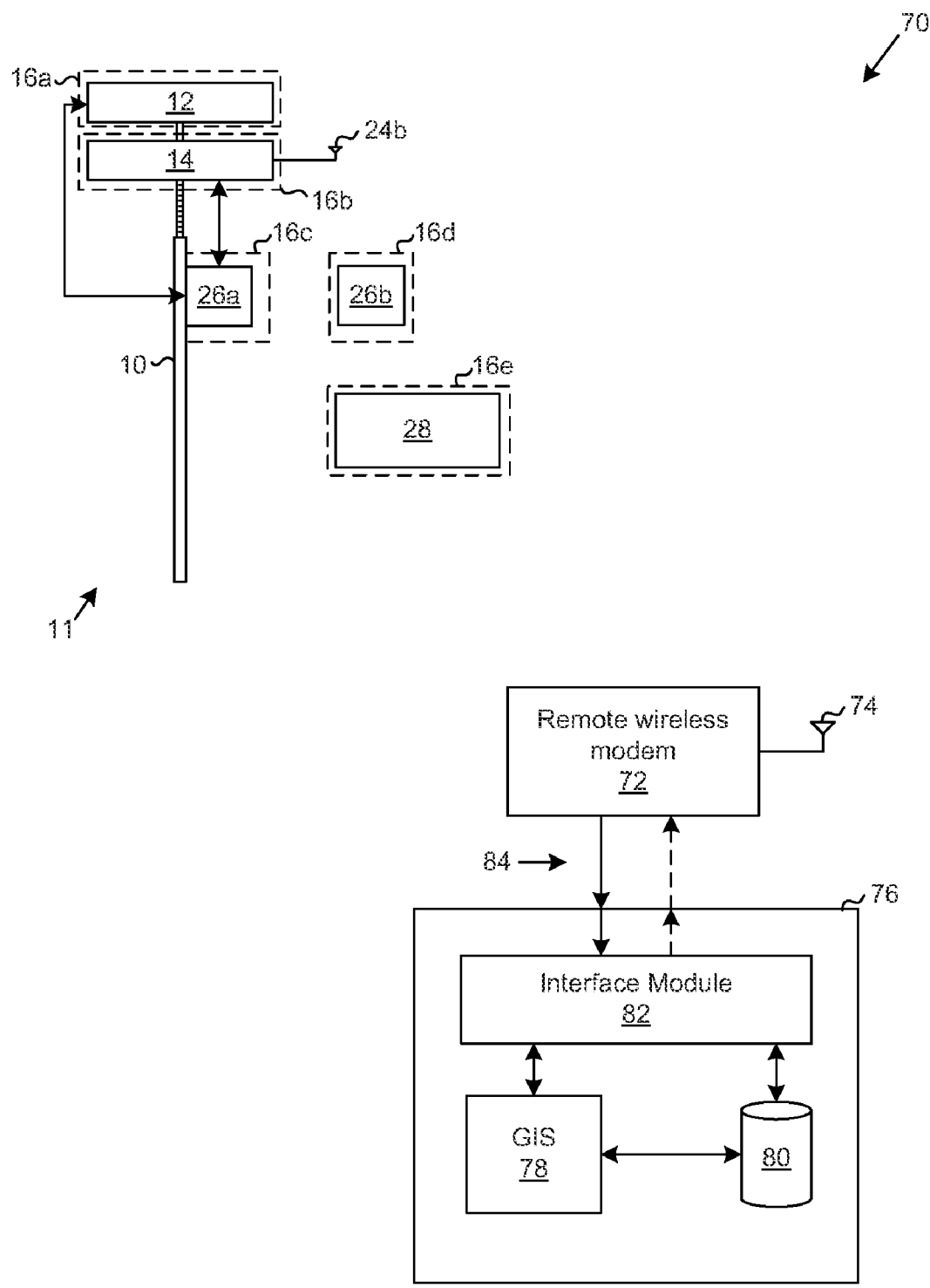
FIG. 7 shows a system for wireless tracking of utility assets.

Turning now to FIG. 7, a system for wireless tracking of utility assets 70 is shown. The system comprises a wireless utility asset mapping device 11, a remote wireless modem 72 in wireless communication with the wireless utility asset mapping device 11, and a remote asset tracking computer 76 in communication with the remote wireless modem 72.

The remote wireless modem 72 may include an additional antenna 74. The remote wireless modem 72 is the same as, or compatible with, wireless modem 14. The remote wireless modem 72 may comprise a receive only modem (or be operated in a receive only mode), or may comprise a transceiver for both receiving and transmitting data. Transmissions from wireless modem 14 as described above are received by remote wireless modem 72. If, as disclosed with reference to FIG. 5, the wireless utility asset mapping device receives and displays related information, the related information may be transmitted by the remote wireless modem 72. The remote wireless modem 72 transmits the related information over long distance.

The information received by the remote wireless modem 72 is stored, and if desired or necessary, processed by the remote asset tracking computer 76. For example the coordinates transmitted by the wireless modem 14 and received by the remote wireless modem 72 are stored in database 80. All other information and data may be stored in database 80. While FIG. 7 shows one database, it is understood that this is merely a symbolic representation and there could, in fact, be more than one database. The more than one database can comprise physically separate databases stored on physically distinct storage devices, and/or logically separate databases stored on a common storage device.

Databases are well understood and include, by way of example, Oracle databases, SQL databases, and various type of relational databases. Also, the remote asset tracking computer 76 and equivalents herein may include an embedded system or a general purpose computer, such as a computer based on an Intel or AMD microprocessor and running an operating system such as Microsoft Windows, UNIX, or Linux. The remote asset tracking computer 76 may also run a real time operating system.

The remote asset tracking computer also comprises a geographic information system (GIS) 78. Geographic information systems are will understood by those having ordinary skill in the art. Generally, a GIS comprises systems and methods for capturing, managing, analyzing and displaying geographically referenced information. In this case, the geographically referenced information includes data associated with utility assets as described above. Most commonly, the geographically referenced information is displayed over a map. The information and map may be manipulated, studied, and analyzed to visualize additional levels of detail, information, and relationships between the information and the geography. There are many GIS products, and many of these can be adapted for the specific purpose of tracking and visualizing utility assets. For example, a partial list of compatible GIS includes MapServer, GRASS (Geographic Resources Analysis Support System), gvSIG, JUMP GIS, MapWindow GIS, OpenMAP, Quantum GIS, ERSI GIS products such as ArcGIS, and many more. Still another example of a GIS which is specifically tailored for utility asset tracking and visualization is GraniteXP by CUES, Inc.

GIS 78, database 80, and any other modules of remote access tracking computer may comprise a computer readable medium such as a volatile or non-volatile solid state memory, magnetic storage medium, optical storage medium, magneto-optical storage medium, or any other storage medium including a computer readable program which when executed on a computer causes the computer to perform the steps of a geographic information system, a database, a wireless tracking utility asset method, and other methods.

Notwithstanding the specific GIS implementation, GIS 78 accesses database 80. Also, depending on the specific GIS 78, remote asset tracking computer 78 may further comprise interface module 82. Interface module 82 receives data from remote wireless modem 72 and performs any necessary or desired processing so the data, including any control signals (such as the capture signal) can be processed and stored by GIS 78 and database 80.

Most every GIS includes an API (Application Programming Interface) so that external application (such as, for example, interface module 82) can communicate with the GIS. In one example, the GIS GraniteXP mentioned above includes an interface module 82 called a GPS plugin module for communicating with GIS 78, database 80, remote wireless modem 72 and, by extension, wireless utility mapping device 11.

Remote asset tracking computer 76 may also include other modules such as import/export modules for importing and exporting GIS data in a format compatible with other geographic information systems. Also, remote asset tracking computer 76 may include report modules for generating reports and output in various formats, including formats that are compliant with government regulations and/or industry standards. The report modules and import/export modules may also generate and serve data in formats such as XML, XHTML, and HTML, which are accessible over the internet and readable by web applications, and may employ AJAX (Asynchronous JavaScript and XML) and SOAP (Simple Object Access Protocol). Of course, these are only a few example of protocols, languages, and techniques that may be employed, and many others are possible for internet based web development. Also, the report modules and import/export modules may generate text based reports, Portable Document Format (PDF) based reports, reports compatible with spreadsheets, and the like.

As pointed to by arrow 84 of FIG. 7, remote wireless modem 72 is in communication with remote asset tracking computer 76. This communication may be by way of a wired connection or a wireless connection. By way of example, a few of the ways the communication can be established include: a wired connection or network using a serial or parallel port, or an Ethernet cable, or a wired network such as a local area network and/or Ethernet network; a wireless connection or network such as a WiFi network or wireless LAN like IEEE 802.11, or wireless personal area network like a Bluetooth network like IEEE 802.15, or a wireless metropolitan area network such as WiMax like IEEE 802.16, or a cellular or mobile phone communications network, or a proprietary network; or, the Internet. It is appreciated that more than one of these may used for communication between remote wireless modem 72 and remote asset tracking computer 76.

Also, communication 84 may be through an additional, or more than one additional computer and/or network. For example, remote wireless modem 72 may communicate with an additional remote asset tracking computer connected to the Internet. The additional remote asset tracking computer may in turn, communicate via the Internet to remote asset tracking computer 76.

FIG. 8 shows a method for wirelessly tracking utility assets. Keeping the discussion of FIGS. 2-5 in mind, the method comprises locating a utility asset (step 86), placing a wireless utility asset mapping device over the location of the utility asset (step 88), determining a coordinate of the wireless utility asset mapping device (step 90), wirelessly transmitting the coordinate over long distance (step 92), wireless receiving the coordinate (step 94), transmitting the received coordinate to a remote asset tracking computer located a long distance away from the wireless utility asset mapping device (step 96), and storing the coordinate in a database in the remote asset tracking computer (step 98).

The step of locating (step 86) was disclosed in detail above with reference to FIG. 2. Also, referring to FIG. 9, and referencing the disclosure related to FIG. 3, locating further comprises physically locating an approximate location of the utility asset (step 100), and inspecting the utility asset from the approximate location to determine a more precise location (step 102). Further, said wireless transmitting further, for at least one (step 102), a depth measurement, a sensor measurement, a still image, a video, text, and audio: wirelessly transmitting (step 92), wirelessly receiving (step 94), transmitting to the remote asset tracking device computer (step 96), and storing in the database (step 98).

Referring to FIG. 10 and referencing the disclosure above related to other utility asset information (step 50 of FIG. 4), the method also may include, wirelessly transmitting over long distance other utility asset information (step 104), followed by, for the other utility asset information, the steps of wirelessly receiving (step 94), transmitting (step 96), and storing (step 98).

Also, with reference to the discussion of FIG. 5, related information may be received and displayed proximal to the wireless utility asset mapping device. Examining FIG. 11, the method includes transmitting from the remote utility asset tracking computer and over long distance, information related to the utility asset (step 106), receiving over long distance and proximal to the wireless utility asset mapping device the information related to the utility asset (step 108), and displaying the related information proximal to the wireless utility asset mapping device (step 110).

Figure 12:
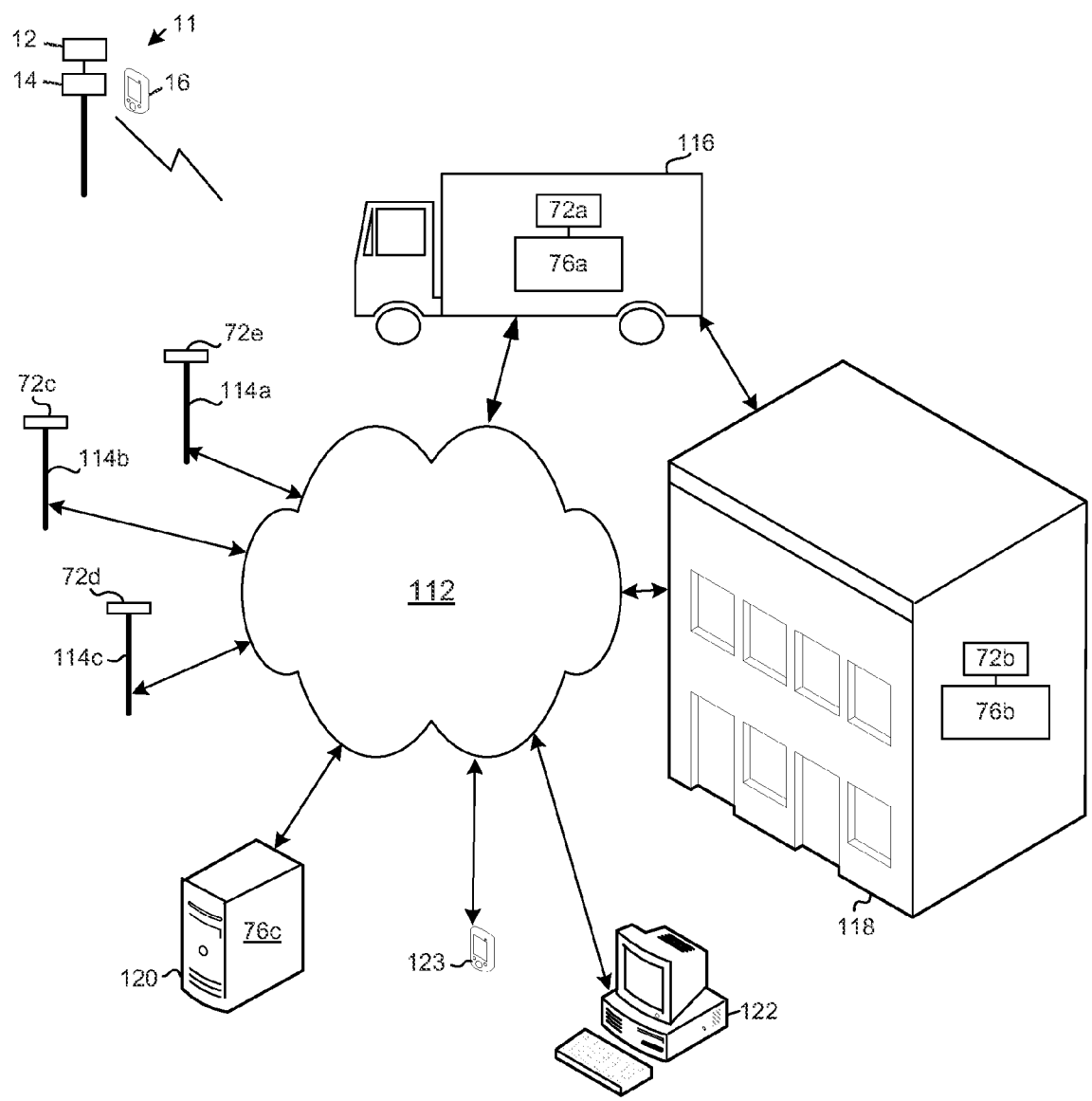
FIG. 12 shows various system configurations for wirelessly tracking utility assets.

FIG. 12 shows various systems configurations for wirelessly tracking utility assets, in accordance with the above disclosure. A utility worker takes wireless utility asset mapping device 11 in the field in order to track utility assets. Only one wireless utility asset mapping device 11 is shown, but many more may be used simultaneously. Long distance transmissions from the wireless utility asset mapping device 11 may be received and the methods disclosed above carried out in any number of ways, for example:

1) A utility truck 116 carries remote wireless modem 72a and remote utility asset tracking computer 76a which are in wireless communication with the wireless utility asset mapping device 11;

2) The utility truck 116 may in turn be connected to a network 112, such as the Internet (wirelessly and/or wired), and communicate with any number of remote asset tracking computers, for example asset tracking computer 120. More than one utility truck may be in simultaneous communication with computer 120, in which case computer 120 is a central remote asset tracking computer server which acts as a central repository for all utility assets;

3) The utility truck 116 may be connected to a wireless network that communicates with remote wireless modem 72b and remote asset tracking computer 76b located, for example, in a government or municipal building 118. This remote asset tracking computer 76b, may, in turn, be connected to the Internet 112, that communicates with exemplary central remote asset tracking computer server 120.

4) Utility poles, towers, or other raised permanent fixtures 114a, 114b 114c comprise remote wireless modems 72c, 72d, 72e which are in communication with any wireless utility asset mapping device 11 that is within range. Remote wireless modems 72c, 72d, 72e are in communication with network 112, and thus, with a remote asset tracking such as computer 120.

5) Each municipality has a remote asset tracking computer 76b which receives utility asset information from wireless utility asset mapping devices 11 via trucks 116 and/or utility poles 114. Each remote asset tracking computer 76b of each municipality is connected to the Internet 112 and in turn to central remote asset tracking computer 120, which, may be, for example, a state-wide database, or a country-wide database.

6) Users such as government officials, enforcement officers, utility workers, inspectors, and the like may access (wirelessly or wired) via computer 122 or mobile device 123 central remote asset tracking computer 120, or municipality 118, to display asset information and/or generate reports. For example, worker in the field may access computer 120 via a web enabled phone or pda to obtain gps coordinates of an asset, and/or to view a GIS display via a web browser of utility asset in the area, and/or view and access the GIS in real-time, and/or view or print a location and all available infrastructure layers noted in the GIS for the location, and/or access historical information such as listings of previous inspections, and/or access the GIS to initiate and annotate new inspections, and/or make additions and corrections to recorded data.

The foregoing detailed description has discussed only a few of the many forms that any invention disclosed herein can take. It is intended that the foregoing detailed description be understood as an illustration of selected forms that the invention can take and not as a definition of the invention. It is only the following claims, including all equivalents, that are intended to define the scope of this invention.

What is claimed is:

1. A handheld wireless utility asset mapping device comprising:
   a handheld pole having a top end, a bottom end, and a middle section extending from the top end to the bottom end, wherein the top end is telescoping;
   a positioning receiver connected to the top end of said handheld pole;
   a wireless modem connected to said handheld pole and to said positioning receiver; and
   at least one weatherproof housing connected to said handheld pole and enclosing said positioning receiver and said wireless modem.

2. The device of claim 1 further comprising at least one battery connected to said positioning receiver and said wireless modem.

3. The device of claim 2 further comprising a solar powered source connected to at least one of said positioning receiver, said wireless modem, and said at least one battery.

4. The device of claim 1 wherein said positioning receiver comprises a sub-meter global positioning receiver.

5. The device of claim 1 wherein said positioning receiver comprises a wireless transceiver, wherein said wireless transceiver operates according to an 802.xx wireless specification.

6. The device of claim 1 wherein said wireless modem operates in a frequency band around 900 megahertz or greater.

7. The device of claim 6 wherein said wireless modem is a spread spectrum modem.

8. The device of claim 1 wherein said wireless modem operates according to an 802.xx wireless specification.

9. The device of claim 1 wherein said pole is variable in length.

10. The device of claim 9 wherein the length of said pole is variable from around three feet to around seven feet.

11. The device of claim 9 wherein said pole further includes marking indicating the length of said pole.

12. The device of claim 1 wherein the length of said pole is between around 3 feet to around 7 feet.

13. The device of claim 1 wherein the bottom end of said pole comprises at least one of the following: a point, a stand, a helical device, or a sensor.

14. The device of claim 1 wherein said at least one weatherproof housing is brightly colored.

15. The device of claim 1 further comprising at least one antenna extending from said at least one weatherproof housing.

16. The device of claim 15 wherein said at least one antenna is connected to said wireless modem.

17. The device of claim 15 wherein said at least one antenna is connected to said positioning receiver.

18. The device of claim 1 wherein at least one of said positioning receiver and said wireless modem comprise a communications port.

19. The device of claim 1 further comprising an external interface module in communication with at least one of said wireless modem and said positioning receiver.

20. The device of claim 19 wherein said external interface module is connected to said pole around the middle of said pole.

21. The device of claim 19 wherein said external interface module is not connected to said pole.

22. The device of claim 19 wherein said external interface module comprises at least one of the following: a switch, a button, a handheld computer, a wireless mobile device, a touch screen, a keyboard or keypad, antennas, a camera, a speaker, a microphone, lights, light emitting diodes, liquid crystal displays, an antenna, circuits, and ports.

23. The device of claim 22 further comprising at least one more weatherproof housing enclosing said external interface module.

24. The device of claim 19 further comprising at least one of the following in communication with said external interface module: a line locator, a metal detector, a still camera, a video camera, a radar device, an acoustic sensor, a magnetic detector, an electromagnetic detector, a gas detector, a sonar, a sonde transmitter, a sonde receiver, a submersible camera, a robotic crawler, a pipe scrubbing and scraping device, a smart pig, a horizontal drilling device, a vertical drilling device, a thermal imaging device, a microgravity detector, a radiation detector, an x-ray device, a pressure measuring device, and a seismic detector.

25. A handheld wireless utility asset mapping device comprising:
- a handheld pole having a top end, a bottom end, and a middle section extending from the top end to the bottom end, wherein the top end of said handheld pole is telescoping, wherein said pole is variable in length, wherein said pole includes marking indicating the length of said pole;
- a positioning receiver connected to the top end of said handheld pole, wherein said positioning receiver is a sub-meter global positioning receiver;
- a wireless modem connected to said handheld pole and to said positioning receiver, wherein said wireless modem is connected closer to the top end of said pole than the bottom end of said pole;
- an external interface module in communication with said wireless modem;
- a wireless transceiver connected to said pole and in communication with at least one of said wireless modem and said positioning receiver, wherein said wireless transceiver is operable to transmit and receive packetized wireless data;
- a power source connected to said positioning receiver, said wireless modem, said external interface module, and said wireless transceiver;
- at least one weatherproof housing enclosing said positioning receiver, said wireless modem, said external interface module, and said wireless transceiver; and
- an antenna connected to said wireless modem and extending from said at least one weatherproof housing.

26. The device of claim 25 further comprising external equipment in communication with said external interface module.

* * * * *